(12) United States Patent
Zeiber et al.

(10) Patent No.: US 7,575,024 B2
(45) Date of Patent: Aug. 18, 2009

(54) THREADED COUPLING WITH FLOW SHUTOFF

(75) Inventors: Dennis Zeiber, Erie, PA (US); Steve Wilkins, Union City, PA (US)

(73) Assignee: Snap-Tite Technologies, Inc., Wilmington, DE (US)

(*) Notice: Subject to any disclaimer, the term of this patent is extended or adjusted under 35 U.S.C. 154(b) by 397 days.

(21) Appl. No.: 11/267,482

(22) Filed: Nov. 5, 2005

(65) Prior Publication Data
US 2007/0102051 A1 May 10, 2007

(51) Int. Cl.
*F16L 37/23* (2006.01)
(52) U.S. Cl. .......................... 137/614.05; 137/614.03; 251/149.1; 251/149.6
(58) Field of Classification Search ............ 137/614.03, 137/614.04, 614.05; 251/149.1, 149.6
See application file for complete search history.

(56) References Cited

U.S. PATENT DOCUMENTS

| | | | |
|---|---|---|---|
| 3,224,728 A | 12/1965 | Buseth |
| 3,464,436 A | 9/1969 | Bruning |
| 3,930,674 A | 1/1976 | Jonsson |
| 3,957,292 A | 5/1976 | Diggs |
| 3,973,791 A | 8/1976 | Porta et al. |
| 3,976,313 A | 8/1976 | Lauffenburger |
| 4,005,735 A | 2/1977 | Miyamoto |
| 4,030,798 A | 6/1977 | Paoli |
| 4,039,213 A | 8/1977 | Walters |
| 4,063,756 A | 12/1977 | Anderson |
| 4,074,698 A | 2/1978 | Hobson et al. |
| 4,082,319 A | 4/1978 | Berger et al. |

(Continued)

FOREIGN PATENT DOCUMENTS

EP 0 686 801 A1 12/1995

(Continued)

OTHER PUBLICATIONS

Faster,Screw-on Quick-Release Couplings, CAT.0114-GB, pp. 1-33, Faster, CAT 114/03-03-GB, Faster S p.A.

(Continued)

*Primary Examiner*—Kevin L Lee
(74) *Attorney, Agent, or Firm*—Woodling, Krost and Rust

(57) ABSTRACT

A thread to connect coupling comprising a female coupling half and a male coupling half is disclosed and claimed wherein the male coupling half includes a recess in the exterior of the male body which extends circumferentially therearound. The female coupling half includes a valve, a female body, and a female body extension affixed to the female body. The female body further includes a sliding sleeve movable with respect to the valve between a first position abutting and closing the valve and a second position opening the valve. The male body interengages the sliding sleeve and moves therewith during coupling and uncoupling. During uncoupling, the sliding sleeve is reliably positioned sealingly against the valve because the sliding sleeve is interlocked with the male body such that as the male body is withdrawn from the female body the sliding sleeve comes with the male body. Separation of the coupling halves requires that an outer sleeve release a second set of detents which acts as a permissive to uncoupling. The coupling halves may not be separated by vibrating the threaded surfaces of the respective coupling halves apart.

45 Claims, 7 Drawing Sheets

U.S. PATENT DOCUMENTS

| | | |
|---|---|---|
| 4,098,292 A | 7/1978 | Evans |
| 4,125,279 A | 11/1978 | Scott |
| 4,126,338 A | 11/1978 | Coel et al. |
| 4,148,459 A | 4/1979 | Martinez |
| 4,157,196 A | 6/1979 | De Meulemeester |
| 4,166,475 A | 9/1979 | Gano |
| 4,198,076 A | 4/1980 | Mezei |
| 4,199,131 A | 4/1980 | Boski et al. |
| 4,210,348 A | 7/1980 | Hobson et al. |
| 4,211,253 A | 7/1980 | Ekman |
| 4,219,048 A | 8/1980 | Ekman |
| 4,221,235 A | 9/1980 | Maldavs |
| 4,236,736 A | 12/1980 | Anderson |
| 4,258,936 A | 3/1981 | Goldberg |
| 4,269,389 A | 5/1981 | Ekman |
| 4,286,807 A | 9/1981 | Bachli |
| 4,289,164 A | 9/1981 | Ekman |
| 4,313,628 A | 2/1982 | Duenke |
| 4,330,142 A | 5/1982 | Paini |
| 4,335,747 A | 6/1982 | Mitsumoto et al. |
| 4,347,870 A | 9/1982 | Maldavs |
| 4,348,039 A | 9/1982 | Miller |
| 4,350,321 A | 9/1982 | Berg |
| 4,366,945 A | 1/1983 | Blauenstein |
| 4,373,551 A | 2/1983 | Shindelar |
| 4,392,513 A | 7/1983 | Parrish |
| 4,398,561 A | 8/1983 | Maldavs |
| 4,407,482 A | 10/1983 | Daghe et al. |
| 4,407,529 A | 10/1983 | Holman |
| 4,442,863 A | 4/1984 | Magorien |
| 4,443,028 A | 4/1984 | Hayes |
| 4,449,739 A | 5/1984 | Raether |
| 4,470,490 A | 9/1984 | Morel |
| 4,477,109 A | 10/1984 | Kleuver |
| 4,486,037 A | 12/1984 | Shotbolt |
| 4,487,462 A | 12/1984 | Gale et al. |
| 4,496,173 A | 1/1985 | Roche et al. |
| 4,502,662 A | 3/1985 | Maldavs |
| 4,527,816 A | 7/1985 | Bresie et al. |
| 4,543,993 A | 10/1985 | Calvin et al. |
| 4,543,994 A | 10/1985 | Johnson et al. |
| 4,543,995 A | 10/1985 | Weh et al. |
| 4,546,956 A | 10/1985 | Moberg |
| 4,549,576 A | 10/1985 | Angel |
| 4,564,042 A | 1/1986 | Ekman |
| 4,565,392 A | 1/1986 | Vyse |
| 4,583,711 A | 4/1986 | Johnson |
| 4,588,213 A | 5/1986 | Bollfrass et al. |
| 4,596,272 A | 6/1986 | Medvick et al. |
| 4,597,413 A | 7/1986 | Buseth |
| 4,598,896 A | 7/1986 | Maldavs |
| 4,616,856 A | 10/1986 | Kowalyshen |
| 4,618,173 A | 10/1986 | Dopyera et al. |
| 4,625,998 A | 12/1986 | Draudt et al. |
| 4,647,075 A | 3/1987 | Vargo |
| 4,650,221 A | 3/1987 | Calliouet, Jr. |
| 4,650,529 A | 3/1987 | Guest |
| 4,671,540 A | 6/1987 | Medvick et al. |
| 4,688,830 A | 8/1987 | Meisinger et al. |
| 4,688,831 A | 8/1987 | Viehmann |
| 4,691,941 A | 9/1987 | Rabushka et al. |
| 4,702,278 A | 10/1987 | Badoreaux |
| 4,703,774 A | 11/1987 | Seehausen |
| 4,738,463 A | 4/1988 | Poore et al. |
| 4,745,948 A | 5/1988 | Wilcox |
| 4,768,551 A | 9/1988 | Allread et al. |
| 4,786,029 A | 11/1988 | Laipply et al. |
| 4,792,163 A | 12/1988 | Kulle |
| 4,794,937 A | 1/1989 | Hofmann |
| 4,827,977 A | 5/1989 | Fink, Jr. |
| 4,835,873 A | 6/1989 | Weems |
| 4,836,584 A | 6/1989 | Baker |
| 4,846,506 A | 7/1989 | Bocson et al. |
| 4,854,345 A | 8/1989 | Badoreaux |
| 4,861,209 A | 8/1989 | Larsson |
| 4,865,077 A | 9/1989 | Batchen et al. |
| 4,865,292 A | 9/1989 | Ekman |
| 4,887,849 A | 12/1989 | Briet |
| 4,896,697 A | 1/1990 | Stromdahl |
| 4,898,199 A | 2/1990 | Morris et al. |
| 4,904,001 A | 2/1990 | Sasa et al. |
| 4,904,002 A | 2/1990 | Sasa et al. |
| 4,905,965 A | 3/1990 | Dolev |
| 4,907,830 A | 3/1990 | Sasa et al. |
| 4,911,194 A | 3/1990 | Lechner |
| 4,913,855 A | 4/1990 | Panzica |
| 4,915,423 A | 4/1990 | Wallace |
| 4,923,349 A | 5/1990 | Logsdon |
| 4,924,909 A | 5/1990 | Wilcox |
| 4,944,377 A | 7/1990 | Elsner |
| 4,955,645 A | 9/1990 | Weems |
| 4,966,398 A | 10/1990 | Peterson |
| 4,974,635 A | 12/1990 | Hanus et al. |
| 4,981,311 A | 1/1991 | Kinney |
| 4,982,929 A | 1/1991 | Spurling |
| 5,004,209 A | 4/1991 | Paquette |
| 5,009,252 A | 4/1991 | Faughn |
| 5,015,017 A | 5/1991 | Geary |
| 5,016,920 A | 5/1991 | Anderson |
| 5,027,855 A | 7/1991 | Jaggi |
| 5,031,941 A | 7/1991 | Bartholomew |
| 5,042,850 A | 8/1991 | Culler |
| 5,063,965 A | 11/1991 | Wilcox |
| 5,070,597 A | 12/1991 | Holt et al. |
| 5,072,755 A | 12/1991 | Wilcox |
| 5,083,890 A | 1/1992 | Gabilondo |
| 5,088,866 A | 2/1992 | Ischebeck et al. |
| 5,096,235 A | 3/1992 | Oetiker |
| 5,103,868 A | 4/1992 | Wilkins |
| 5,107,930 A | 4/1992 | Hopper |
| 5,120,092 A | 6/1992 | Gorog et al. |
| 5,123,446 A | 6/1992 | Haunhorst et al. |
| 5,123,448 A | 6/1992 | Kjelberg |
| 5,139,049 A | 8/1992 | Jensen et al. |
| 5,141,014 A | 8/1992 | Poli et al. |
| 5,149,053 A | 9/1992 | Galli |
| 5,152,554 A | 10/1992 | LaFleur et al. |
| 5,159,955 A | 11/1992 | Ekman |
| 5,165,728 A | 11/1992 | Mayer |
| 5,174,611 A | 12/1992 | Byrd et al. |
| 5,188,399 A | 2/1993 | Durina |
| 5,191,914 A | 3/1993 | Gonzalez |
| 5,192,219 A | 3/1993 | Fowler et al. |
| 5,195,785 A | 3/1993 | Jellison |
| 5,203,477 A | 4/1993 | Lo |
| 5,205,002 A | 4/1993 | Sage-Passant |
| 5,222,520 A | 6/1993 | Anderson et al. |
| 5,222,772 A | 6/1993 | McGraw |
| 5,226,682 A | 7/1993 | Marrison et al. |
| 5,234,437 A | 8/1993 | Sepetka |
| 5,239,848 A | 8/1993 | Nichols, Jr. |
| 5,248,306 A | 9/1993 | Clark et al. |
| 5,251,940 A | 10/1993 | DeMoss et al. |
| 5,255,714 A | 10/1993 | Mullins |
| 5,261,240 A | 11/1993 | Oyler et al. |
| 5,273,071 A | 12/1993 | Oberrecht |
| 5,293,902 A | 3/1994 | Lapierie |
| 5,316,033 A | 5/1994 | Schumacher et al. |
| 5,316,347 A | 5/1994 | Arosio |
| 5,316,352 A | 5/1994 | Smith |
| 5,320,133 A | 6/1994 | Nimberger |
| 5,322,331 A | 6/1994 | Waldschmidt et al. |
| 5,323,812 A | 6/1994 | Wayne |
| 5,325,890 A | 7/1994 | Wilkins |

| | | | | | |
|---|---|---|---|---|---|
| 5,328,209 A | 7/1994 | Cromwell | 5,975,589 A | 11/1999 | Wilkins |
| 5,337,782 A | 8/1994 | Wilcox | 5,984,266 A | 11/1999 | Kotake |
| 5,342,098 A | 8/1994 | Wilkins | 5,988,697 A | 11/1999 | Arosio |
| 5,360,035 A | 11/1994 | Smith | 5,992,903 A | 11/1999 | Bartholomew |
| 5,362,109 A | 11/1994 | Pacht | 6,007,106 A | 12/1999 | Wilkins |
| 5,366,259 A | 11/1994 | Hohmann et al. | 6,009,901 A | 1/2000 | Roberts |
| 5,378,100 A | 1/1995 | Fullerton | 6,016,835 A | 1/2000 | Maldavs |
| 5,388,874 A | 2/1995 | Barrier | 6,026,857 A | 2/2000 | Stucchi |
| 5,390,963 A | 2/1995 | Namekawa | 6,033,169 A | 3/2000 | Bettger |
| 5,404,909 A | 4/1995 | Hanson | 6,050,298 A | 4/2000 | Lacroix et al. |
| 5,413,387 A | 5/1995 | Bartholomew | 6,053,540 A | 4/2000 | Meyer |
| 5,443,291 A | 8/1995 | Stucchi | 6,068,044 A | 5/2000 | Fahl |
| 5,452,736 A | 9/1995 | Arosio | 6,073,974 A | 6/2000 | Meisinger |
| 5,454,602 A | 10/1995 | Anderson et al. | 6,086,113 A | 7/2000 | Bartholomew |
| 5,535,984 A | 7/1996 | Anderson et al. | 6,095,190 A | 8/2000 | Wilcox et al. |
| 5,540,250 A | 7/1996 | Mullins | 6,099,044 A | 8/2000 | Weh et al. |
| 5,546,985 A | 8/1996 | Bartholomew | 6,116,277 A | 9/2000 | Wilcox et al. |
| 5,553,893 A | 9/1996 | Foti | 6,122,777 A | 9/2000 | Sage-Passant |
| 5,553,895 A | 9/1996 | Karl et al. | 6,135,509 A | 10/2000 | Billington, III |
| 5,556,139 A | 9/1996 | Wilkins | 6,142,538 A | 11/2000 | Volgstadt |
| 5,564,471 A | 10/1996 | Wilder et al. | 6,145,539 A | 11/2000 | Wilcox et al. |
| 5,575,510 A | 11/1996 | Weh et al. | 6,155,294 A | 12/2000 | Cornford et al. |
| 5,580,200 A | 12/1996 | Fullerton | 6,158,717 A | 12/2000 | Van Scyoc et al. |
| 5,592,970 A | 1/1997 | Stucchi et al. | 6,206,431 B1 | 3/2001 | Street |
| 5,607,139 A | 3/1997 | Kjelberg | 6,254,144 B1 | 7/2001 | Hagan |
| 5,613,816 A | 3/1997 | Cabahug | 6,267,418 B1 | 7/2001 | Hogue et al. |
| 5,623,959 A | 4/1997 | Granmoe | 6,279,962 B1 | 8/2001 | McGarian et al. |
| 5,628,344 A | 5/1997 | Roberts | 6,283,151 B1 | 9/2001 | Countryman et al. |
| D383,378 S | 9/1997 | Schrader et al. | 6,283,443 B1 | 9/2001 | Taneya |
| 5,662,141 A | 9/1997 | Arosio | 6,286,877 B1 | 9/2001 | Mendoza et al. |
| 5,681,061 A | 10/1997 | Olson | 6,298,876 B1 | 10/2001 | Bogdonoff et al. |
| 5,707,086 A | 1/1998 | Treu et al. | 6,312,339 B1 | 11/2001 | Beyert |
| 5,709,416 A | 1/1998 | Wood | 6,328,352 B1 | 12/2001 | Geppert et al. |
| 5,713,607 A | 2/1998 | Webb | 6,338,504 B1 | 1/2002 | Hilliard |
| 5,730,185 A | 3/1998 | Wilkins | 6,357,811 B1 | 3/2002 | Nakamura |
| 5,732,984 A | 3/1998 | Bartholomew | 6,358,078 B1 | 3/2002 | Crippa |
| 5,733,084 A | 3/1998 | Fullerton | 6,364,369 B2 | 4/2002 | Bailey |
| 5,746,454 A | 5/1998 | Webb | 6,375,152 B1 | 4/2002 | Weh et al. |
| 5,752,690 A | 5/1998 | Ellet | 6,382,251 B1 | 5/2002 | Hopson |
| 5,752,726 A | 5/1998 | Fixemer | 6,386,596 B1 | 5/2002 | Olson |
| 5,775,738 A | 7/1998 | Bartholomew | 6,398,268 B1 | 6/2002 | Takahashi et al. |
| 5,788,443 A | 8/1998 | Cabahug | 6,408,880 B1 | 6/2002 | Kaul |
| 5,800,108 A | 9/1998 | Cabahug | 6,422,267 B1 | 7/2002 | Makishima et al. |
| 5,806,564 A | 9/1998 | Wilcox | 6,439,558 B1 | 8/2002 | Arosio |
| 5,806,832 A | 9/1998 | Larbuisson | 6,516,880 B1 | 2/2003 | Otten et al. |
| 5,816,621 A | 10/1998 | Frost | 6,517,344 B2 | 2/2003 | Scanlon |
| 5,816,623 A | 10/1998 | Chang | 6,523,861 B1 | 2/2003 | Clancy et al. |
| 5,823,222 A | 10/1998 | Minshull et al. | 6,523,863 B2 | 2/2003 | Ishiwata |
| 5,841,095 A | 11/1998 | Lu et al. | 6,543,812 B1 | 4/2003 | Chang |
| 5,853,204 A | 12/1998 | Bartholomew | 6,557,824 B1 | 5/2003 | Jenski, Jr. et al. |
| 5,857,713 A | 1/1999 | Bartholomew | 6,557,899 B2 | 5/2003 | Martine-Cocher et al. |
| 5,863,079 A | 1/1999 | Donais et al. | 6,557,904 B2 | 5/2003 | Naito |
| 5,871,239 A | 2/1999 | Boscaljon et al. | 6,561,551 B2 | 5/2003 | Kawakami et al. |
| 5,873,386 A | 2/1999 | Arosio | 6,565,127 B2 | 5/2003 | Webb |
| 5,881,769 A | 3/1999 | Hopson | 6,568,717 B1 | 5/2003 | Le Clinche |
| 5,884,897 A | 3/1999 | Arosio | 6,588,806 B2 | 7/2003 | Arosio |
| 5,890,517 A | 4/1999 | Laible | 6,588,807 B1 | 7/2003 | Burke et al. |
| 5,893,391 A | 4/1999 | Jesnki, Jr. | 6,592,151 B2 | 7/2003 | Densel et al. |
| 5,911,445 A | 6/1999 | Lee | 6,604,762 B2 | 8/2003 | Sagaser |
| 5,918,633 A | 7/1999 | Zeiber | 6,629,707 B1 | 10/2003 | Yamaguchi et al. |
| 5,921,588 A | 7/1999 | Vogel et al. | 6,655,656 B2 | 12/2003 | Maldavs |
| 5,924,747 A | 7/1999 | Miyashita | 6,659,130 B2 | 12/2003 | Arosio |
| 5,927,683 A | 7/1999 | Weh et al. | 6,672,626 B1 | 1/2004 | Schafer et al. |
| 5,927,761 A | 7/1999 | Bartholomew | 6,675,833 B2 | 1/2004 | Maldavs |
| 5,934,709 A | 8/1999 | Morrison | 6,675,841 B2 | 1/2004 | Burns |
| 5,937,899 A | 8/1999 | Zeiber | 6,681,803 B2 * | 1/2004 | Taneya et al. .......... 137/614.03 |
| 5,947,071 A | 9/1999 | Alcamo | 6,682,106 B2 | 1/2004 | Parker |
| 5,947,532 A | 9/1999 | Lorenz | 6,684,906 B2 | 2/2004 | Burns et al. |
| 5,951,728 A | 9/1999 | Hopson | 6,691,978 B1 | 2/2004 | Bartos et al. |
| 5,954,370 A | 9/1999 | Pietersen | 6,715,801 B2 | 4/2004 | Zhadanov |
| 5,961,159 A | 10/1999 | Ekman | 6,719,270 B2 | 4/2004 | Ozawa |
| 5,964,484 A | 10/1999 | Bartholomew | 6,722,701 B1 | 4/2004 | Godinez |
| 5,971,787 A | 10/1999 | Brown | 6,749,231 B2 | 6/2004 | LeMay et al. |

| | | |
|---|---|---|
| 6,776,187 B1 | 8/2004 | Marquis et al. |
| 6,779,777 B2 | 8/2004 | Kouda |
| 6,785,053 B2 | 8/2004 | Savage, Jr. |
| 6,811,187 B2 | 11/2004 | Otten et al. |
| 6,814,340 B2 | 11/2004 | Arosio |
| 6,830,059 B1 | 12/2004 | Zeiber et al. |
| 6,840,276 B2 | 1/2005 | Zeiber et al. |
| 6,843,506 B2 | 1/2005 | Osborne |
| 6,854,772 B2 | 2/2005 | Weller et al. |
| 6,866,064 B2 | 3/2005 | Nanni, Jr. et al. |
| 6,871,878 B2 | 3/2005 | Miros |
| 6,880,859 B2 | 4/2005 | Breay et al. |
| 6,910,719 B1 | 6/2005 | Zeleny et al. |
| 6,916,008 B2 | 7/2005 | Noble et al. |
| 6,926,031 B2 | 8/2005 | Zeiber et al. |
| 6,926,310 B1 | 8/2005 | Weh et al. |
| 6,935,614 B2 | 8/2005 | Schneller et al. |
| 6,938,636 B1 | 9/2005 | Nimberger |
| 6,945,273 B2 | 9/2005 | Reid |
| 6,962,347 B2 | 11/2005 | Smith, III |
| 6,971,684 B2 | 12/2005 | Ferrari |
| 2002/0038955 A1 | 4/2002 | Persohn et al. |
| 2002/0062869 A1 | 5/2002 | Toyokawa et al. |
| 2002/0109351 A1 | 8/2002 | Densel et al. |
| 2002/0113431 A1 | 8/2002 | LeMay et al. |
| 2002/0134959 A1 | 9/2002 | Noble et al. |
| 2002/0149200 A1 | 10/2002 | Fumioka |
| 2002/0185864 A1 | 12/2002 | LeMay et al. |
| 2003/0057699 A1 | 3/2003 | Persohn et al. |
| 2004/0070197 A1 | 4/2004 | Densel et al. |
| 2004/0079423 A1 | 4/2004 | Miyika et al. |
| 2004/0103946 A1 | 6/2004 | Nanni, Jr. et al. |
| 2004/0124634 A1 | 7/2004 | Arosio |
| 2004/0169372 A1 | 9/2004 | LeMay et al. |
| 2004/0244848 A1 | 12/2004 | Maldavs |
| 2005/0005975 A1 | 1/2005 | Marrison et al. |
| 2005/0098753 A1 | 5/2005 | Ozaki et al. |
| 2005/0116466 A1 | 6/2005 | Arosio |
| 2005/0206160 A1 | 9/2005 | Ericksen et al. |
| 2005/0242581 A1 | 11/2005 | Nowling et al. |
| 2008/0271797 A1 | 11/2008 | Zeiber |

FOREIGN PATENT DOCUMENTS

| | | |
|---|---|---|
| EP | 0 862 010 B1 | 1/2000 |
| EP | 0 787 905 B1 | 11/2002 |
| EP | 1 431 648 A1 | 12/2003 |
| EP | 1 273 844 B1 | 12/2004 |
| EP | 1 538 385 A1 | 6/2005 |

OTHER PUBLICATIONS

Snap-tite, 78 Series—Thread to Connect Couplings, pp. 1-4, 01-0016 BE-0200, Snap-tite Erie, PA USA.

Snap-tite, Snap-tite QD & V: 75 Series, Snap-tite Quick Disconnect & Valve Division, 2006, pp. 1-2, Snap-Tite Erie, PA USA.

Snap-tite, Snap-tite QD & V: 76 Series, Snap-tite Quick Disconnect & Valve Division, 2006, pp. 1-2, Snap-tite, Erie, PA USA.

Snap-tite, Snap-tite QD & V: 78 Series, Snap-tite Quick Disconnect & Valve Division, 2006, pp. 1-2, Snap-tite, Erie, PA USA.

Snap-tite, Snap-tite Coupling Assembly 75 Series, Drawing No. A199 Rev. EB, Oct. 11, 2004, A199 pp. 1, Snap-tite Inc. Union City, PA USA.

Snap-tite, Snap-tite Coupling Assembly 76 Series, Drawing No. A109, May 16, 1984, A109 p. 1, Snap-tite Inc. Union City, PA USA.

U.S. Appl. No. 12/175,774, Zeiber.

International Preliminary Report on Patentability, Jun. 6, 2008, PCT/US06/22848 Corresponding to U.S. Appl. No. 11/267,482.

International Search Report, Aug. 3, 2007, PCT/US06/22848 Corresponding to U.S. Appl. No. 11/267,482.

Written Opinion, Aug. 3, 2007, PCT/US06/22848 Corresponding to U.S. Appl. No. 11/267,482.

* cited by examiner

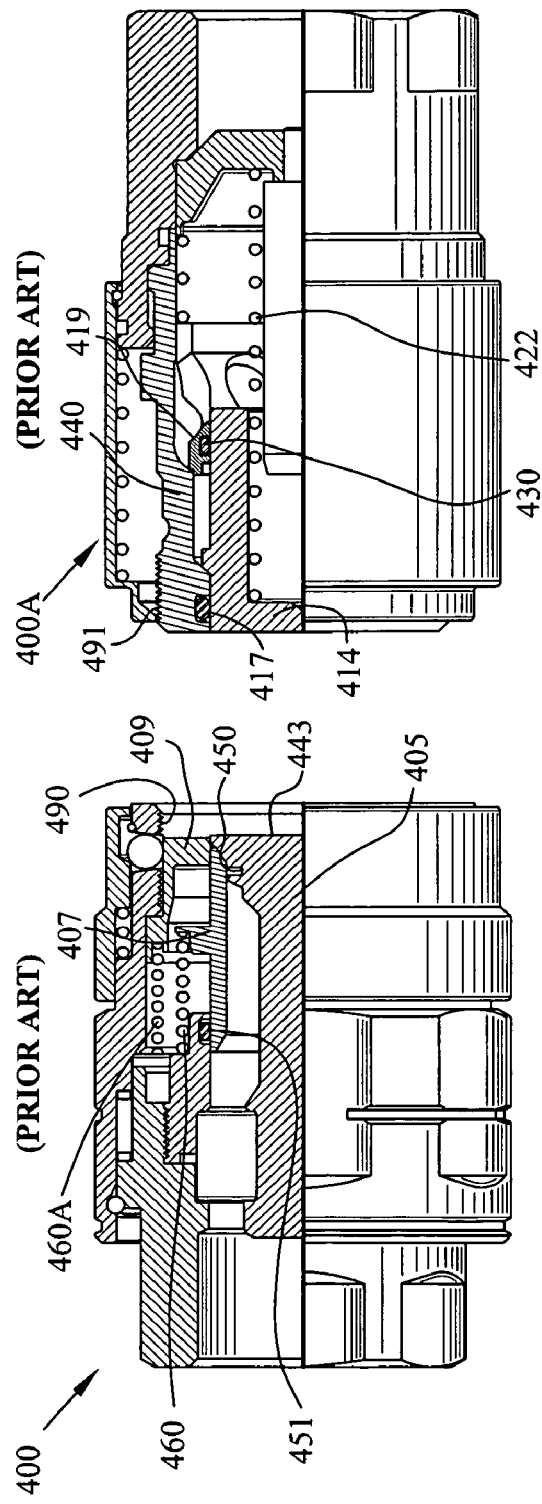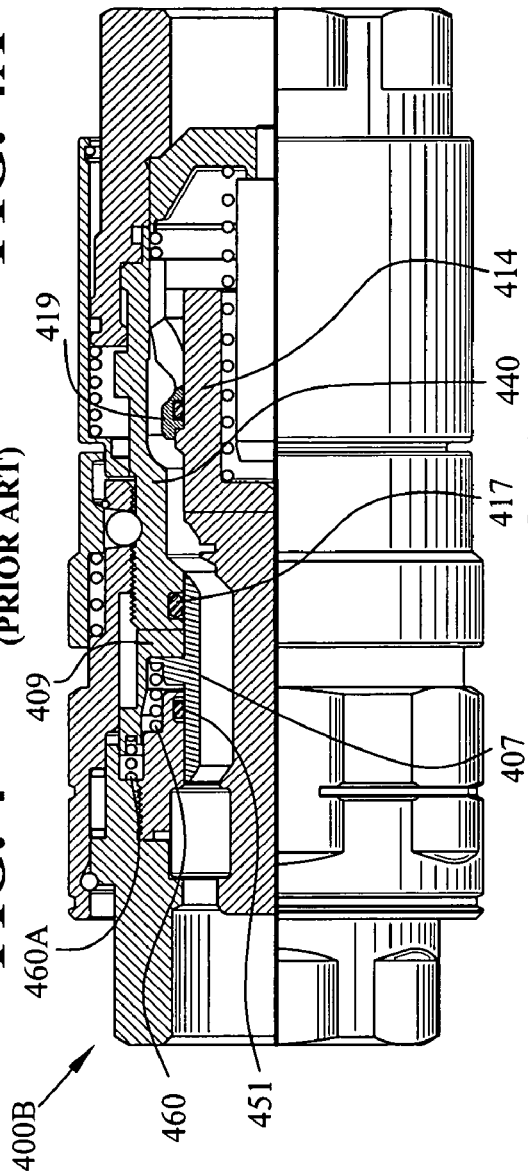

ered recess in the exterior of the sliding sleeve is a circumferentially extending recess in the exterior of the male
THREADED COUPLING WITH FLOW SHUTOFF

FIELD OF THE INVENTION

The invention is in the field of flush face couplings which are threaded together under pressure applied to both the male coupling half and the female coupling half. The coupling of the invention may be used in construction, agriculture and in various manufacturing processes.

BACKGROUND OF THE INVENTION

U.S. Pat. No. 5,662,141 to Arosio issued Sep. 2, 1997 discloses a leak resistant fluid coupling arrangement whereby the female coupling half includes a tubular body shutoff upon which a male body and seal sit. See, FIG. 5 labeled "prior art" herein which is substantially similar to FIG. 3 of the '141 patent illustrating the male body 40 and seal 17" residing adjacent and in engagement with the tubular body shutoff 7 of the female coupling half 2. FIG. 5 is a cross-sectional view 500 of a prior art female coupling half 2 and male coupling half 3 coupled. Reference numeral 4 indicates a hole or passageway for the communication of fluid therethrough. Reference numerals 18/19 signify a valve in the male coupling half 3 of the prior art as illustrated in FIG. 5.

Still referring to FIG. 5 herein, it will be noticed that the tubular body shutoff 7 includes an external stop (unnumbered) located longitudinally in the approximate middle thereof and it is this external stop which engages two springs identified with reference numerals 8 and 10 in FIG. 1 of the '141 patent. Reference numeral 8 is not shown in FIG. 5 herein. Spring 8 operates and acts between a fixed body and the external stop of the tubular body shutoff urging it longitudinally outwardly to shutoff against valve or bolt 5. Spring 10 operates and acts between the external stop and an annular sleeve 9 urging the sleeve longitudinally outwardly to create a flush face along with the flush face of the bolt or valve 5. Action of these two springs has the effect of floating the tubular body shutoff as spring 10 tends to urge the tubular body shutoff away from its closed position while spring 8 tends to urge the tubular body shutoff toward its closed position. Floating of the tubular body shutoff is not desirable because it promotes incomplete closure of the tubular body shutoff against the valve or bolt 5. If the tubular shutoff body 7 of the '141 patent does not move fully outwardly due to swelling of the seals in the device or because of tight tolerances between the parts and uneven expansion thereof, then the tubular shutoff body fails to close thus creating a leak from the female coupling half.

FIG. 4 is a quarter-sectional view 400 of a prior art female coupling half. FIG. 4A is a quarter-sectional view 400A of a prior art male coupling half. FIG. 4B is a quarter-sectional view 400B of a prior art female coupling half and male coupling half coupled. Referring to FIG. 4, a prior art coupling believed to be a product of Faster, SPA, of Italy is illustrated. It will be noted that reference numeral 490 indicates threads on the interior surface of the outer body thereof and the threads are located on both longitudinal sides of the unnumbered detents. This causes reciprocal threads 491 on the male coupling half as illustrated in FIG. 4A to traverse the unnumbered set of detents. Referring to FIGS. 4, 4A and 4B, reference numeral 407 refers to a tubular body shutoff which as stated above in connection with FIG. 5 is prone to hanging up (i.e., not going completely closed) due to the swelling of seal 451 and is not be expelled far enough toward the open end of the coupling half as designated generally by reference numeral 443 which is the flat face of valve or bolt 405. Spring 460 urges the tubular shutoff toward the open end. Spring 460A contributes to urging sleeve 409 toward the open end of the coupling but since sleeve 409 and tubular support 451 are not interlocked, spring 460A does not contribute to insuring that tubular shutoff 407 does in fact shut off.

Still referring to FIGS. 4, 4A, and 4B, reference numeral 414 represents a closed wall of a tubular bolt which is positioned by spring 422. Reference numeral 417 represents a seal which engages the tubular bolt of the male and the tubular body shutoff 407 when the device is coupled. Reference numeral 440 is a bolt body and reference numeral 419 is a shutoff surface and reference numeral 430 is seal. It will be noticed when reference is made to FIG. 4B that spring 460 urges tubular body shutoff 407 toward its closed position as illustrated in FIG. 4. However, the design of the prior art device does not include an interlock of the tubular body shutoff with the male coupling half to insure its closure.

Therefore, it is desirable to avoid leaks upon disconnection of a coupling by ensuring that valve in the female half of the coupling are interlocked with the male coupling half during disconnection of the coupling halves.

SUMMARY OF THE INVENTION

A coupling is disclosed which includes a female coupling half and a male coupling half is disclosed. The male coupling half includes a male body having an exterior with a recess therein which extends circumferentially around the exterior of the male coupling half. The female coupling half includes a valve, a female body, and a female body extension affixed to the female body. The female valve is sometimes referred to herein as a pintle. The valve (pintle) is affixed by threading it to the female body. A sliding sleeve is movable with respect to the female body, the female body extension and the valve. The sliding sleeve is movable between a first position abutting the valve and closing the valve, and, a second position not abutting the valve thus opening the valve.

The male body of the male coupling half interengages the sliding sleeve of the female coupling half during engagement therewith moving the sliding sleeve from the first closed position to the second open position.

The sliding sleeve of the female coupling half includes a first set of detents carried therewith which interengage the circumferentially extending recess in the exterior of the male body during coupling of the coupling halves. The first set of detents are released from interengagement with the circumferentially extending recess in the exterior of the male body of the male coupling half during uncoupling of the halves from each other after the sliding sleeve is moved to the first position abutting the valve of the female coupling half.

The female body extension of the female coupling half includes a second set of detents therein. The sliding sleeve of the female coupling half includes an exterior having a circumferentially extending recess therein and the second set of detents interengage the recess in the exterior of the sliding sleeve during coupling of the coupling halves.

The female body extension includes an inner surface and an outer surface and the inner surface interengages and locks the first set of detents interengaging the recess in the male body of the male coupling half during coupling. The female coupling half includes a locking ring having an inner surface and an outer surface. The locking ring resides radially outwardly of the female body extension of the female coupling half. The inner surface of the locking ring is in sliding engagement with the female body extension of the female coupling half during coupling and locks and interengages the second set of detents interengaging the recess in the exterior surface of the sliding sleeve valve of the female coupling half.

The female coupling half includes an outer sleeve having an inner surface and an outer surface. The inner surface of the outer sleeve includes a shoulder thereon and, during uncoupling, the shoulder engages the locking ring moving the locking ring releasing the second set of detents from the recess in the exterior surface of the sliding sleeve which in turn releases the sliding sleeve enabling movement of the sliding sleeve to the first closed position abutting the valve (pintle) and releasing the first set of detents of the female coupling half.

The female body extension includes a recess in the inner surface thereof. The first set of detents carried with the sliding sleeve is released when positioned adjacent the recess in the inner surface of the female body extension.

The female coupling half includes a first spring operable between the body and the sliding sleeve urging the sliding sleeve longitudinally outwardly. The female coupling half includes a second spring operable between the body and the locking ring urging the locking ring longitudinally outwardly locking the second set of detents in the exterior recess of the sliding sleeve.

The valve/pintle of the female coupling half includes a passageway for breaking vacuum between the sliding sleeve and the body of the female coupling half.

The male and female coupling halves each include a surface having threads thereon for interconnecting the coupling halves. The threaded surfaces do not traverse the first set or second set of detents during coupling and uncoupling.

When the coupling is disconnected, the outer sleeve of the female coupling half is urged outwardly to protect the external acme threads on the female body extension. A cover protects the third spring operable between the cover/body of the female coupling half and the outer sleeve.

As the male coupling half (nipple) engages the female coupling half (coupler), the locking sleeve of the male coupling half with internal threads thereon is rotated to thread onto the external threads on the body extension of the female coupling half. As the threads interengage, the outer sleeve of the female coupling half is forced back against the force of the third spring allowing connection of the coupling halves. As the male body extension of the male coupling half is urged into the body extension of the female coupling half, the first set of detents is urged radially inwardly into the ball race or external recess of the male body extension locking the sliding sleeve of the female coupling half to the male body of the male coupling half. This locks the sliding sleeve of the female coupling half to the male body of the male coupling half when in all positions other than the disconnected position with the valves of the male and female coupling halves closed.

When fully connected or coupled, the second set of detents is urged radially inwardly by the spring biased locking ring into engagement with a second ball race or recess extending circumferentially about the exterior of the sliding sleeve. The locking ring secures the sliding sleeve in the connected or coupled position. If the locking sleeve of the male coupling half is attempted to be rotated under the influence of a person's hand to disconnect (or under the influence of mechanical vibration), the sliding sleeve (which is locked to the male body) prevents any axial movement and prevents disconnection (uncoupling) of the coupling halves. Only when the outer sleeve of the female coupling half is urged against the force of the third spring and engages a shoulder on the locking ring and thus axially moves the locking ring will the second set of detents release the sliding sleeve to travel or move axially toward the first, closed position. While this is occurring the first set of detents remain locked to the male coupling half until the sliding sleeve is moved axially to the first, closed position where the first set of balls are free to move radially outwardly into a recess in the female body extension of the female coupling halves.

Accordingly, it is an object of the invention to provide a thread to connect coupling with positive flow shutoff upon disconnection.

Accordingly, it is an object of the invention to provide a thread to connect coupling which cannot be disengaged by vibration or manually unthreaded without first retracting the outer safety sleeve on the female coupling half.

Accordingly, it an object of the invention to provide a thread to connect coupling with positive flow shutoff upon disconnection which is threaded together without traversing a set of detents with a threaded surface.

These and other objects will be understood when reference is made to the Brief Description of the Drawings, Description of the Invention and Claims which follow hereinbelow.

BRIEF DESCRIPTION OF THE DRAWINGS

FIG. 4 is a quarter-sectional view of a prior art female coupling half.

FIG. 4A is a quarter-sectional view of a prior art male coupling half.

FIG. 4B is a quarter-sectional view of a prior art female coupling half and male coupling half coupled.

Figure 1:
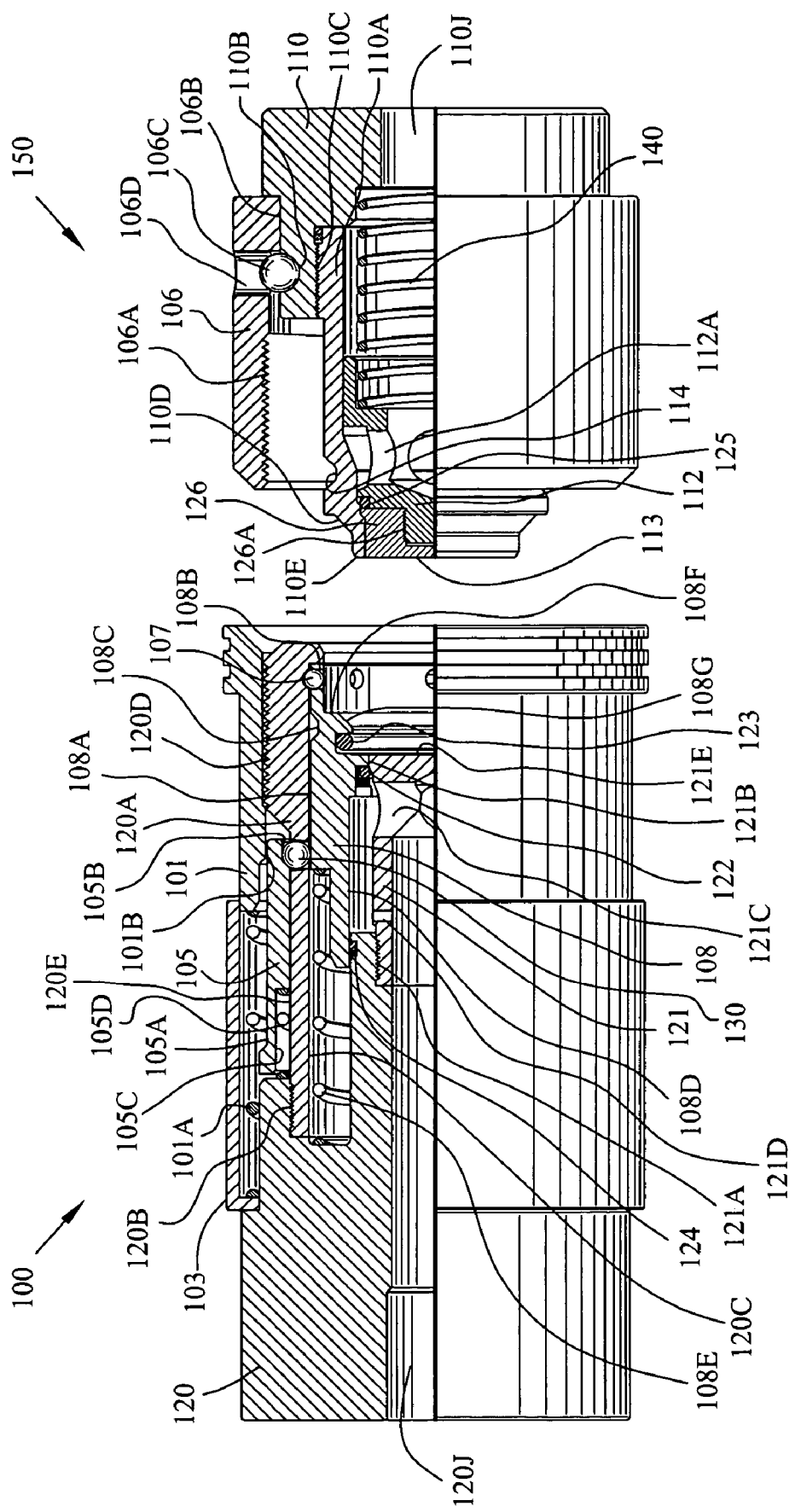
FIG. 1 is a quarter-sectional view of the female coupling half and the male coupling half uncoupled.

A better understanding of the drawing figures will be had when reference is made to the Description of the Invention and Claims which follow hereinbelow.

DESCRIPTION OF THE INVENTION

Figure 1A:
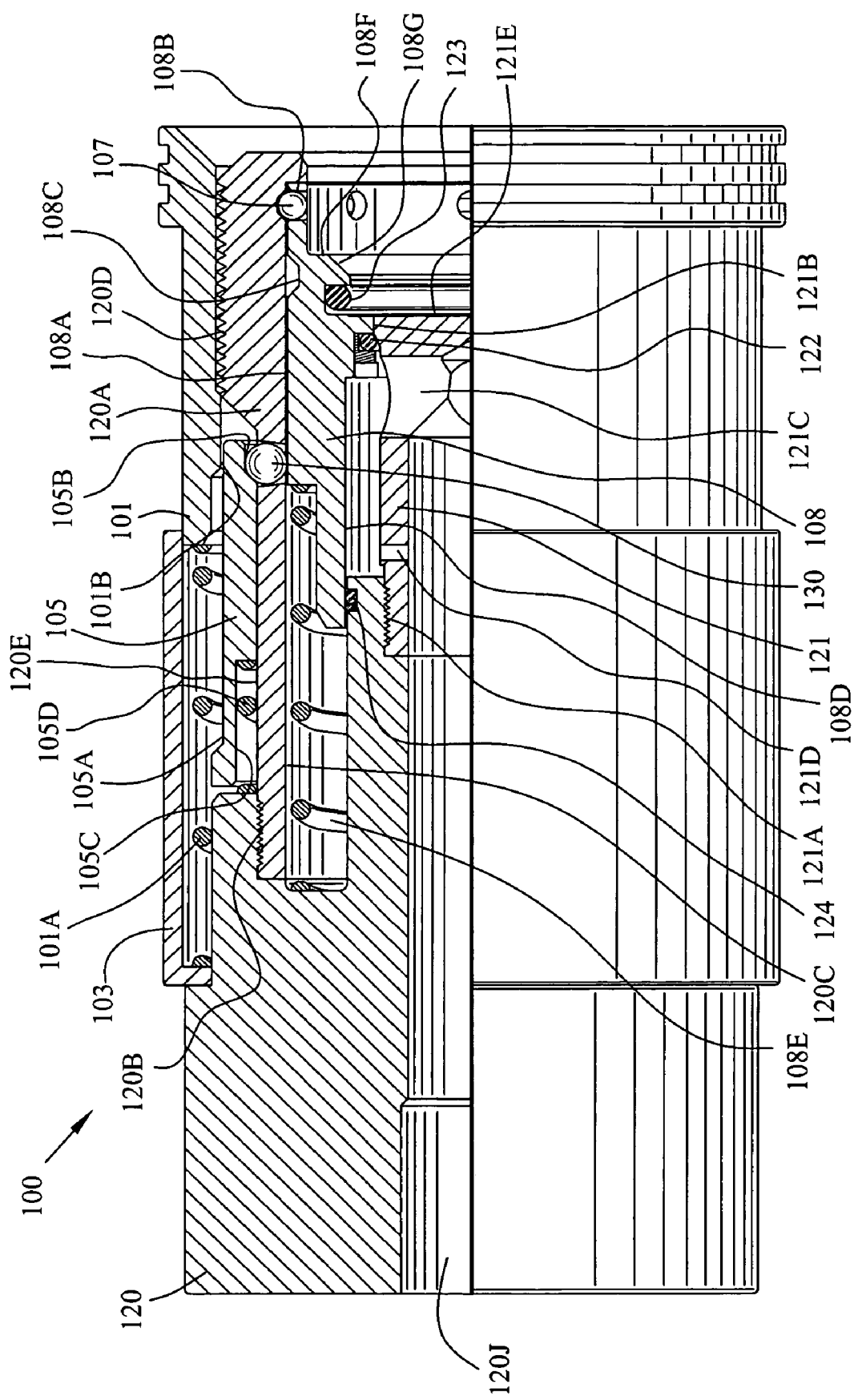
FIG. 1A is an enlarged quarter-sectional view of the female coupling half of FIG. 1.

FIG. 1 is a quarter-sectional view of the female coupling half 100 and the male coupling half 150 uncoupled. FIG. 1A is an enlarged quarter-sectional view 100 of the female coupling half of FIG. 1. And, FIG. 1B is an enlarged quarter-sectional view 150 of the male coupling half of FIG. 1.

Figure 1B:
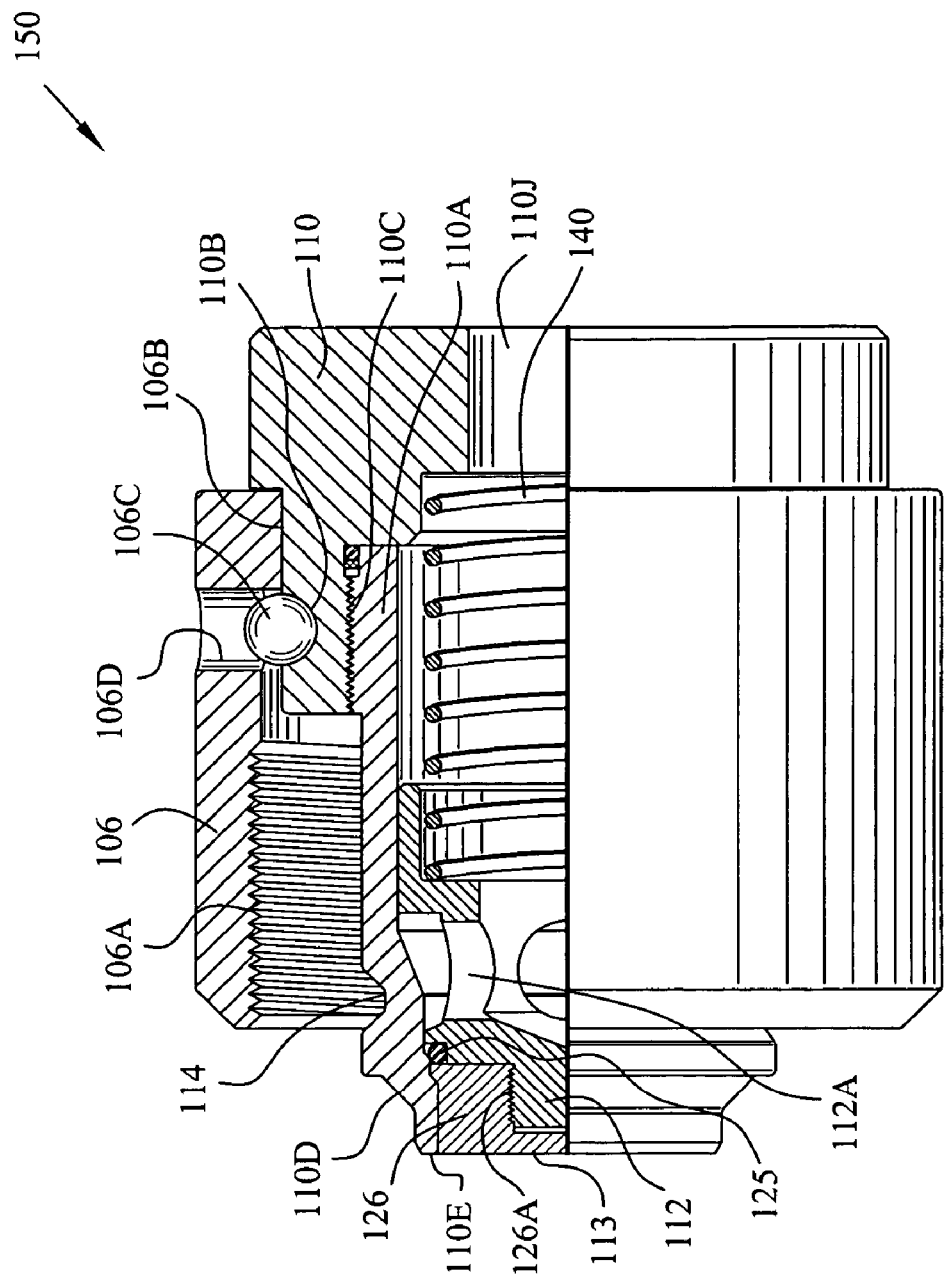
FIG. 1B is an enlarged quarter-sectional view of the male coupling half of FIG. 1.

Referring to FIGS. 1, 1A and 1B, female coupling half 100 includes a body 120 and a body extension 120A threaded 120B thereto. Body extension 120A is essentially concentric with respect to body 120. A passageway 120J is centrally located in body 120. The materials of the body 120 and other structural parts can be any material capable of handling hydraulic fluid at high pressure such as, for instance, stainless steel. The seals used herein may be any suitable elastomeric material used in high pressure hydraulic fluid applications. Body extension 120A includes an inner surface 120C and an outer surface 120E. A portion of the outer surface of the body extension 120A includes threads 120D. The threads are preferably ACME threads. Threads 120D interengage threads 106A of the locking sleeve 106 of the male half of the coupling 150 as is described herein elsewhere with more detail.

Figure 2:
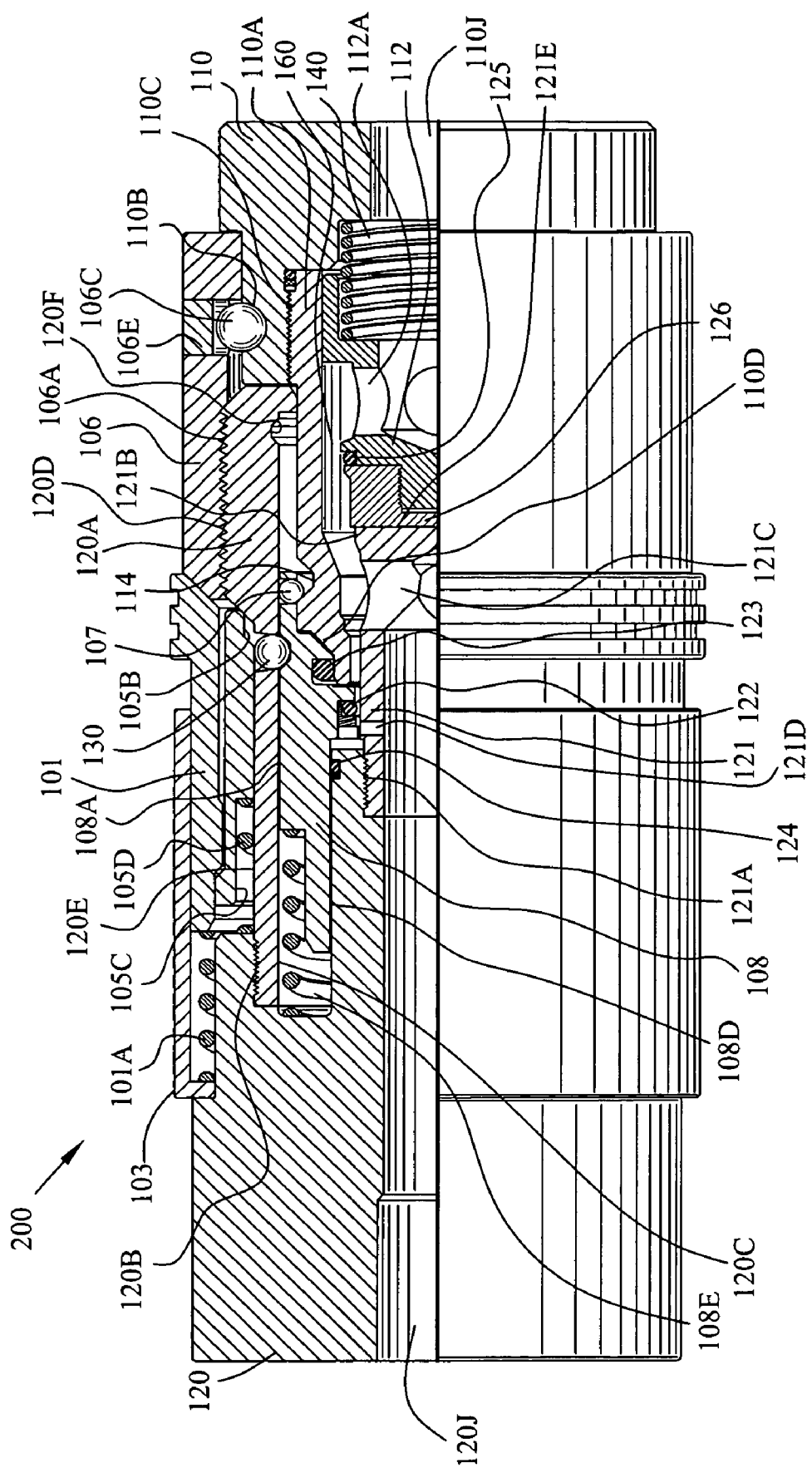
FIG. 2 is an enlarged quarter-sectional view of the female coupling half and the male coupling half coupled.

Referring still to FIGS. 1, 1A and 1B, a pintle or valve 121 is threaded 121A to female body 120. Valve 121 includes a generally flat face 121E which is open in FIG. 1 and engages corresponding flat face 113 of the male coupling half 150. Male coupling half includes a cap 126 which is threaded 126A to valve 112. Valve 112 includes radially extending ports or apertures 112A for communicating with the female half of the coupling as illustrated in FIG. 2. Seal 125 is an elastomeric seal and is trapped between end cap 126 and valve 112 to prevent extrusion or blowout of the seal.

Pintle or valve 121 includes an end portion 121B which is sealed 122 so as to prevent the escape of hydraulic fluid between the interface of the valve 121 and the sliding sleeve 108. Radially extending passageways 121C in valve 121 communicate fluid to the male coupling half as illustrated in FIG. 2 in the coupled condition. Radially extending passageway 121D in valve 121 is a vacuum break which facilitates closure of the sliding sleeve 108 to ensure that seal 122 carried by the sliding sleeve engages valve 121 as indicated by reference numeral 121B. Seal 124, an elastomeric seal, prevents the escape of hydraulic fluid in a path between the female body 120 and the inner surface 108D of the sliding sleeve 108.

Still referring to FIGS. 1, 1A and 1B, sliding sleeve 108 carries a first set of radially movable detents 107 in apertures 108B. Sliding sleeve 108 includes an exterior surface 108A and a circumferentially extending recess or ball race 108C therein. Ball race 108C interengages a second set of detents 130 carried by the body extension 120A. Both the first 107 set of radially movable detents and the second set 130 of radially movable detents are used to reliably secure the coupling halves together. First 107 set of radially movable detents interengage ball race or recess 114 in the exterior of the male body extension 110A of the male coupling half 150 as best viewed in FIG. 2.

Referring again to the sliding sleeve 108 as illustrated in FIGS. 1 and 1A, elastomeric seal 123 is carried in an unnumbered recess or groove and functions to seal surfaces 110E, 110D when the male coupling half is threaded 106A, 120D into the female half of the coupling. See, FIG. 2 illustrating the coupled condition. First spring 108E is operable between female body 120 and an unnumbered shoulder of sliding sleeve 108 and urges the sliding sleeve toward the first, closed position illustrated in FIGS. 1 and 1A. Sliding sleeve 108 is movable between a first, closed position as shown in FIG. 1A to a second, open position as shown in FIG. 2. Referring to FIGS. 1 and 1A and sliding sleeve 108, the leading end includes surfaces 108F and 108G for interengagement with corresponding surfaces generally denoted with reference numerals 110D, 110E in connection with male body extension 110A. Male body extension 110A is threaded 110C to male body 110.

Still referring to FIGS. 1 and 1A, locking ring 105 resides exteriorly to said female body extension 120A and is urged axially outwardly by spring 105D which operates between an unnumbered surface on female body 120 and an unnumbered internal shoulder surface of locking ring 105. Locking ring 105 includes an inner surface 105C and an outer surface 105A. A portion of the outer surface 105A of the locking ring includes a shoulder thereon for engagement with a corresponding internal shoulder on an internal surface 101B of the outer retractable sleeve 101. Reference numeral 105B indicates a recess in the locking ring allowing the second set of detents to be pushed radially outwardly by the sliding sleeve in the first, closed position as indicated in FIG. 1 (disconnected/uncoupled condition).

Still referring to FIGS. 1 and 1A, outer sleeve 101 covers and protects threads 120D on the female body extension 120A. Outer sleeve 101 is retractable for uncoupling against the force of spring 101A which operates between a cover 103 interposed between body 120 and the end of the outer sleeve 101. Cover 103 protects the internal components of the female coupling half against the unwanted intrusion of dirt and debris.

Referring to FIGS. 1 and 1B locking sleeve 106 is rotatably affixed to the male body 110 by detents or balls 106C residing in ball race or recess 110B. An aperture 106D provides a path for insertion of the balls 106C. Reference numeral 106B indicates the interface between the rotatable locking sleeve 106 and the male body 110. Reference numeral 110J indicates a flow passageway for the communication of hydraulic fluid. In the coupled condition as illustrated in FIG. 2, reference numeral 160 indicates the passageway which interconnects the radially extending ports 112A and 121C. Spring 140 operates between male body 110 and the valve 112 which prohibits the flow as shown in the disconnected state (FIG. 1).

FIG. 2 is a quarter-sectional view 200 of the female coupling half 100 and the male coupling half 150 coupled. Reference numeral 106E illustrates a plug for the pathway 106D for the insertion of the balls. Reference numeral 120F indicates a recess in the female body extension 120A which provides room for detents 107 to escape when the male body 106 is being extracted from the female coupling half. Some liberty was taken in the illustration of FIGS. 1 and 1A to the extent that the detent labeled 107 and shown therein would be slightly lower due to the force of gravity. Detents under the force of gravity would in fact be recessed and reside in their apertures 108B.

Still referring to FIG. 2, first spring 108E and third spring 110A are compressed and second spring 105D is extended. The first set of detents 107 engage circumferentially extending recess 114 of the male body extension 110A locking the sliding sleeve 108 and the male body extension 110A together. The second set of detents 130 which are larger than the first set of detents engage circumferentially extending recess 108C. Recess 108C is best illustrated in FIG. 3 with the second set 130 of detents released because of the external movement of the outer sleeve 101 by a person's hand or tool against the force of spring 101A and because of some unthreading of the coupling halves.

Still referring to FIG. 2, sliding sleeve 108 is illustrated in the second, open position under the influence of the male body extension 110A forcing the sliding sleeve leftwardly against the forceful resistance of spring 108E. In the coupled condition as illustrated in FIG. 2, the threads 106A on locking sleeve 106 fully receive the corresponding threads 120D of the female body extension 120A. As threads 106A of the locking sleeve of the male are threaded onto threads 120D of the female body, outer sleeve 101 is urged against spring 101A and the male body extension forces the sliding sleeve 108 against the force of spring 108E first engaging the first set of detents 107 followed by the engagement of the second set 130 of detents with the sliding sleeve. Second set of detents 130 are forced radially inwardly during coupling by the force of spring 105D which acts against the female body and the locking ring 105 which forces the locking ring 105 over the second set of detents 130 and pushes them radially inwardly into ball race or recess 108C of the sliding sleeve.

As the male coupling half is threaded onto and into the female coupling half, the flat face 113 of the end cap 126 engages pintle (valve) 121E and urges the male valve 112 open against the force of the spring 140 thus completing a flow path defined by reference numerals 120J, 121C, 160, 112A and 110J.

Figure 3:
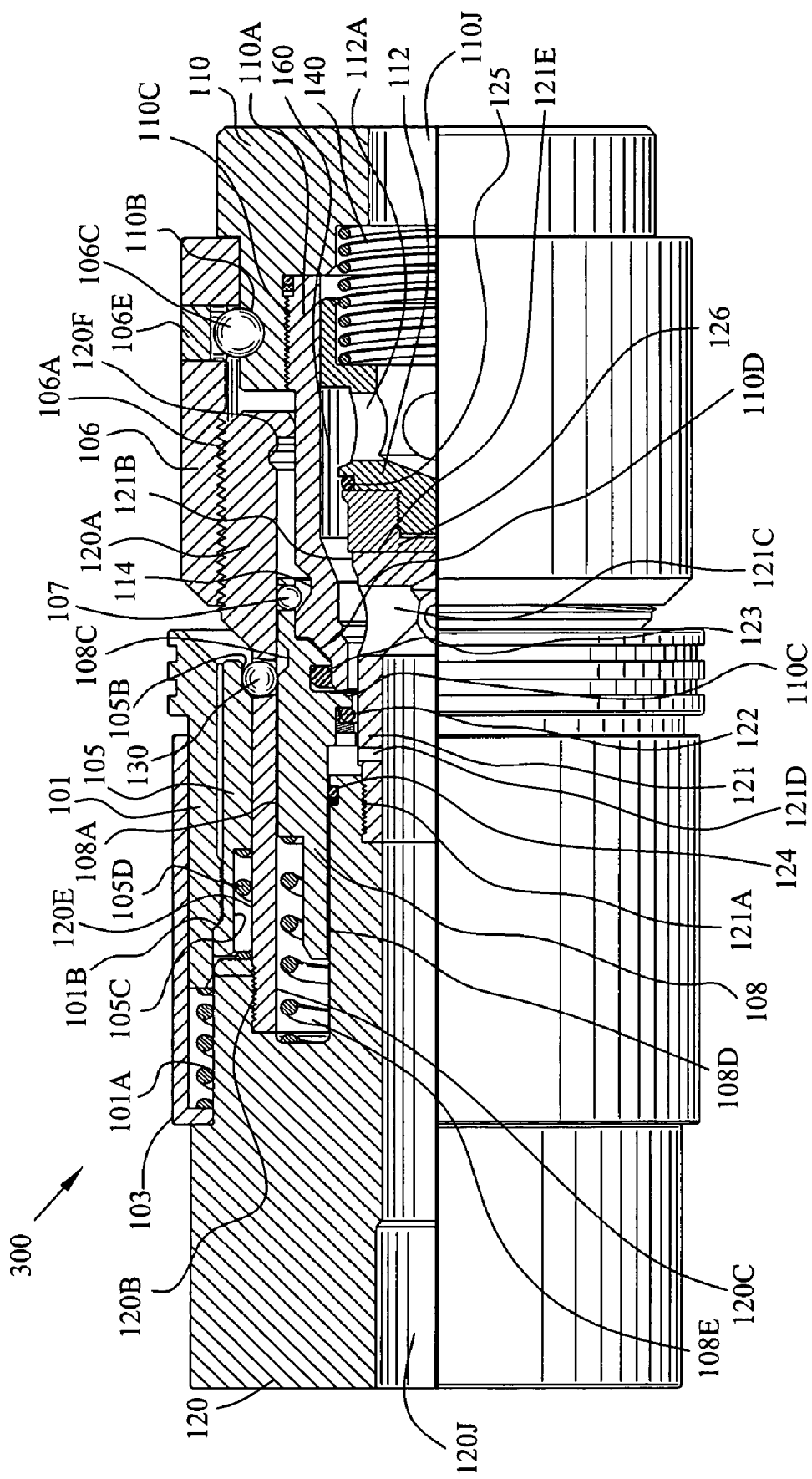
FIG. 3 is an enlarged quarter-sectional view of the female coupling half and the male coupling half in the process of being coupled.
Figure 5:
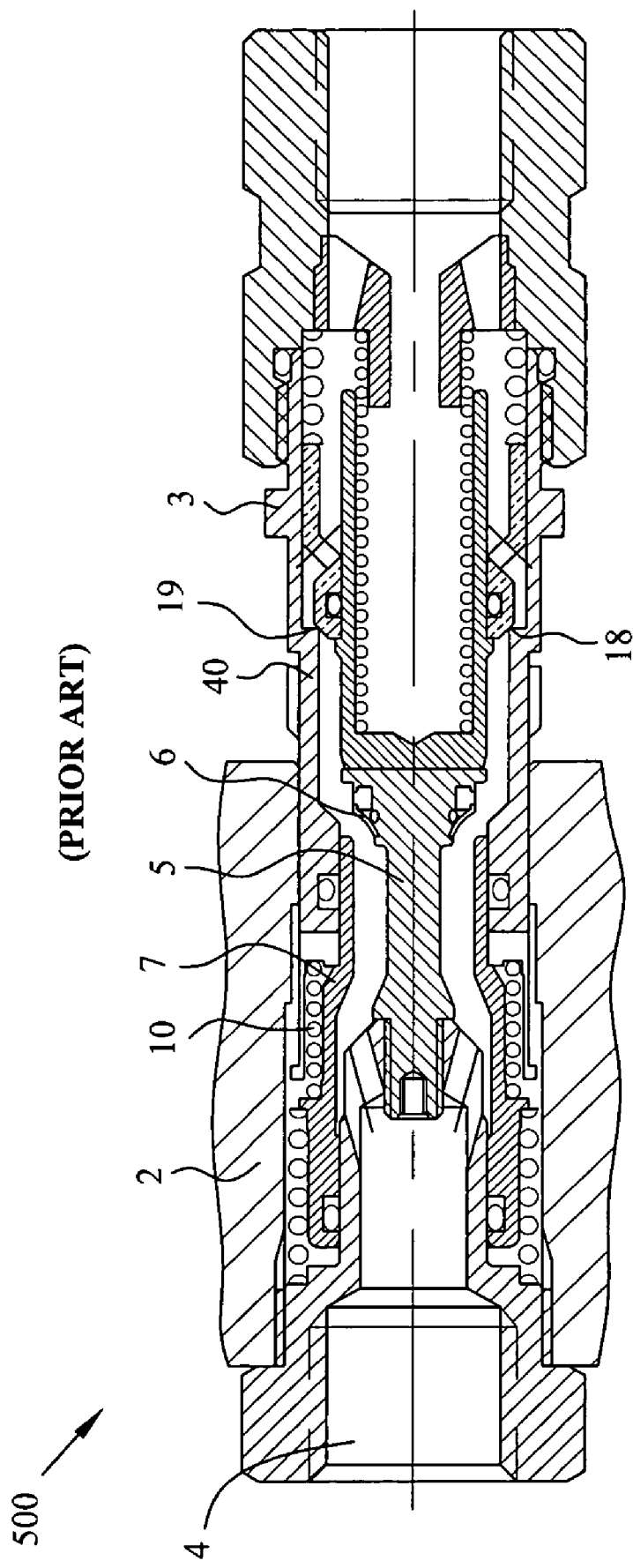
FIG. 5 is a cross-sectional view of a prior art female coupling half and male coupling half coupled.

FIG. 3 is a quarter-sectional view 300 of the female coupling half and the male coupling half in the process of being uncoupled. Referring to FIG. 3, passageway 121D illustrates a vacuum break as the sliding sleeve 108 is extracted under the urging of the male body extension 110A. To uncouple the coupling as illustrated in FIG. 3, the outer sleeve 101 must be pulled leftwardly as shown such that the internal shoulder 101B engages and external shoulder 105A on the locking ring which moves the locking ring against the force of spring 105D allowing and positioning recess 105B above the second set of detents to be thrust radially outwardly of circumferential recess or race 108C under the influence of the tension caused by unthreading the coupling. Therefore, to uncouple the coupling the outer sleeve 101 must be retracted and simultaneously the threaded locking sleeve 106 must be unthreaded from the female body extension. It is not enough for vibration or intentional unthreading alone to separate the coupling halves.

As the male coupling half (nipple) 150 engages the female coupling half (coupler) 100, the locking sleeve 106 of the male coupling half 150 with internal threads 106A thereon is rotated to thread onto the external threads 120D on the body extension 120A of the female coupling half. As the threads interengage, the outer sleeve 101 of the female coupling half is forced back against the force of the third spring 101A allowing connection of the coupling halves. As the male body extension 110A of the male coupling half is urged into the female body extension 120A of the female coupling half, the first set of detents 107 is urged radially inwardly into the ball race 114 or external recess of the male body extension locking the sliding sleeve 108 of the female coupling half to the male body of the male coupling half. This locks the sliding sleeve 108 of the female coupling half to the male body of the male coupling half in all positions other than the disconnected position with the valves 121, 112 of the male and female coupling halves closed.

When fully connected or coupled, the second set of detents 130 is urged radially inwardly by the spring biased 105D locking ring 105 into engagement with a second ball race 108C or recess extending circumferentially about the exterior of the sliding sleeve 108. The locking ring 105 secures the sliding sleeve 108 in the connected or coupled position. If the locking sleeve 106 of the male coupling half is attempted to be rotated under the influence of a person's hand to disconnect (or under the influence of mechanical vibration), the sliding sleeve 108 (which is locked 107/114 to the male body) prevents any axial movement and prevents disconnection (uncoupling) of the coupling halves. Only when the outer sleeve 101 of the female coupling half is urged against the force of the third spring 101A and engages a shoulder 105A on the locking ring 105 and thus axially moves the locking ring 105 will the second set of detents 130 release the sliding sleeve to travel or move axially toward the first, closed position (FIG. 3). It is not necessary to hold the outer sleeve 101 in its retracted position permanently while coupling as the detents move radially outwardly positioning the locking ring 105 in the position illustrated in FIG. 3. While this is occurring the first set 107 of detents remain locked 107/114 to the male coupling half until the sliding sleeve 108 is moved axially to the first, closed position where the first set of balls/detents 107 are free to move radially outwardly into a recess 120F in the female body extension of the female coupling halves.

It will be understood by those skilled in the art that the instant invention has been disclosed and described by way of example only and that numerous modifications and deviations of the example may be made without departing from the spirit and scope of the appended claims.

We claim:
1. A coupling, comprising:
a female coupling half and a male coupling half, said female coupling half and said male coupling half being alternately coupled and uncoupled;
said male coupling half comprises: a male body; said male body of said male coupling half includes an exterior; said exterior of said male body of said male half includes a recess therein which extends circumferentially around said exterior; and, a male valve, said male valve includes a cap affixed to said male valve, said cap includes a flush faced end surface;
said female coupling half comprises: a female valve, said female valve includes a flush faced end surface; a female body; a female body extension affixed to said female body of said female coupling half; a sliding sleeve movable with respect to said female body, said female body extension and said female valve; said sliding sleeve movable between: a first position abutting said female valve and closing said female valve, and, a second position not abutting said female valve thus opening said female valve;
said male body of said male coupling half interengaging said sliding sleeve of said female coupling half during coupling moving said sliding sleeve from said first closed position to said second open position;
simultaneously with said interengagement of said body of said male coupling half and said sliding sleeve of said female coupling half, said flush faced end surface of said female valve of said female coupling half interengages said flush faced end surface of said cap of said male coupling half during coupling;
said sliding sleeve of said female coupling half includes a first set of detents carried therewith; said first set of detents of said sliding sleeve of said female coupling half interengaging said circumferentially extending recess in said exterior of said male body during coupling of said coupling halves; and, said first set of detents being released from interengagement with said circumferentially extending recess in said exterior of said male body of said male coupling half during uncoupling said halves each from the other and after said sliding sleeve is moved to said first position abutting said valve of said female coupling half.

2. A coupling as claimed in claim 1 wherein: said female body extension of said female coupling half includes a second set of detents therein; said sliding sleeve of said female coupling half includes an exterior having a circumferentially extending recess therein; and, wherein said second set of detents interengages said recess in said exterior of said sliding sleeve during coupling of said coupling halves.

3. A coupling as claimed in claim 2 wherein: said female body extension includes an inner surface and an outer surface and said inner surface interengages and locks said first set of detents interengaging said recess in said male body of said male coupling half during coupling; and, said female coupling half includes a locking ring having an inner surface and an outer surface, said locking ring resides radially outwardly of said female body extension of said female coupling half, and said inner surface of said locking ring being in sliding engagement with said female body extension of said female coupling half during coupling locking and interengaging said second set of detents interengaging said recess in said exterior surface of said sliding sleeve valve of said female coupling half.

4. A coupling as claimed in claim 3 wherein: said female coupling half includes an outer sleeve having an inner surface and an outer surface, said inner surface having a shoulder thereon; and, during uncoupling, said shoulder on said inner surface of said outer sleeve engaging said locking ring moving said locking ring releasing said second set of detents from said recess in said exterior surface of said sliding sleeve which in turn releases said sliding sleeve enabling movement of said sliding sleeve to said first closed position abutting said valve and releasing said first set of detents of said female coupling half.

5. A coupling as claimed in claim 4 wherein said female body extension includes a recess in said inner surface thereof and said first set of detents is released when said first set of detents carried with said sliding sleeve is positioned adjacent said recess in said inner surface of said female body.

6. A coupling as claimed in claim 5 wherein: said male coupling half includes a locking sleeve having an interior and an exterior, said interior of said locking sleeve having threads thereon; and, said female body extension includes threads on said exterior thereof which interengage said threads of said interior of said locking sleeve of said male coupling half during coupling of said halves each to the other.

7. A coupling comprising a female coupling half and a male coupling half as claimed in claim 1 wherein a first spring is operable between said female body and said sliding sleeve urging said sliding sleeve longitudinally outwardly.

8. A coupling comprising a female coupling half and a male coupling half as claimed in claim 3 wherein: a first spring is operable between said female body and said sliding sleeve urging said sliding sleeve longitudinally outwardly; and, a second spring is operable between said female body and said locking ring urging said locking ring longitudinally outwardly locking said second set of detents in said exterior recess of said sliding sleeve.

9. A coupling comprising a female coupling half and a male coupling half as claimed in claim 4 wherein: a first spring is operable between said female body and said sliding sleeve urging said sliding sleeve longitudinally outwardly; and, a second spring is operable between said female body and said locking ring urging said locking ring longitudinally outwardly locking said second set of detents in said exterior recess of said sliding sleeve.

10. A coupling as claimed in claim 1 wherein said valve of said female coupling half includes a passageway for breaking vacuum between said sliding sleeve and said body of said female coupling half.

11. A coupling as claimed in claim 1 wherein: said male and female coupling halves each include a surface having threads thereon for interconnecting said coupling halves; and, said threaded surfaces do not traverse said first set of detents during coupling and uncoupling.

12. A coupling as claimed in claim 2 wherein: said male and female coupling halves each include a surface having threads thereon for interconnecting said coupling halves; and, said threaded surfaces do not traverse said first and second set of detents during coupling and uncoupling.

13. A coupling as claimed in claim 3 wherein: said male and female coupling halves each include a surface having threads thereon for interconnecting said coupling halves; and, said threaded surfaces do not traverse said first and second set of detents during coupling and uncoupling.

14. A coupling as claimed in claim 4 wherein: said male and female coupling halves each include a surface having threads thereon for interconnecting said coupling halves; and, said threaded surfaces do not traverse said first and second set of detents during coupling and uncoupling.

15. A coupling as claimed in claim 5 wherein: said male and female coupling halves each include a surface having threads thereon for interconnecting said coupling halves; and, said threaded surfaces do not traverse said first and second set of detents during coupling and uncoupling.

16. A coupling as claimed in claim 6 wherein: said male and female coupling halves each include a surface having threads thereon for interconnecting said coupling halves; and, said threaded surfaces do not traverse said first set and second set of detents during coupling and uncoupling.

17. A coupling as claimed in claim 7 wherein: said male and female coupling halves each include a surface having threads thereon for interconnecting said coupling halves; and, said threaded surfaces do not traverse said first and second set of detents during coupling and uncoupling.

18. A coupling as claimed in claim 8 wherein: said male and female coupling halves each include a surface having threads thereon for interconnecting said coupling halves; and, said threaded surfaces do not traverse said first and second set of detents during coupling and uncoupling.

19. A coupling as claimed in claim 9 wherein: said male and female coupling halves each include a surface having threads thereon for interconnecting said coupling halves; and, said threaded surfaces do not traverse said first and second set of detents during coupling and uncoupling.

20. A coupling half for coupling and uncoupling with another coupling half, comprising: a valve, said valve includes a flush faced end portion; a body and a body extension affixed to said body; said valve affixed to said body; a sliding sleeve movable with respect to said body, said body extension and said valve thus opening and closing said valve; said body and said body extension are substantially concentric and said sliding sleeve resides substantially radially intermediate said body and said body extension; a closing mechanism, said closing mechanism includes a first set of locking detents, said sliding sleeve carries said first set of locking detents, and said closing mechanism insuring that said sliding sleeve is returned to said closed position when said coupling half is uncoupled.

21. A coupling half for coupling and uncoupling with another coupling half as claimed in claim 20 wherein said closing mechanism includes a second set of locking detents.

22. A coupling half for coupling and uncoupling with another coupling half as claimed in claim 21 wherein said second set of locking detents is carried by said body extension.

23. A coupling half for coupling and uncoupling with another coupling half as claimed in claim 22 wherein said first set of locking detents is carried by said sliding sleeve.

24. A coupling half for coupling and uncoupling with another coupling half as claimed in claim 20 wherein said closing mechanism includes a spring operable between said body and said sliding sleeve.

25. A coupling half for coupling and uncoupling with another coupling half as claimed in claim 21 wherein said closing mechanism includes a spring operable between said body and said sliding sleeve.

26. A coupling half for coupling and uncoupling with another coupling half as claimed in claim 22 wherein said closing mechanism includes a spring operable between said body and said sliding sleeve.

27. A coupling half for coupling and uncoupling with another coupling half as claimed in claim 23 wherein said closing mechanism includes a spring operable between said body and said sliding sleeve.

28. A coupling, comprising:
a female coupling half and a male coupling half;
said male coupling half comprises: a male body; said male body of said male half of said coupling includes an exterior; said exterior of said male body of said male half includes a recess therein which extends circumferentially around said exterior; and, a male valve, said male valve includes a cap affixed to said male valve, said cap includes a flush faced end surface;

said female coupling half comprises: a female valve, said female valve includes a flush faced end surface; a female body; a female body extension affixed to said female body; a sliding sleeve movable with respect to said female body, said female body extension and said female valve; said sliding sleeve movable between: a first position abutting said female valve and closing said female valve, and, a second position not abutting said female valve thus opening said female valve; and, a sliding sleeve and female valve closing mechanism; said closing mechanism includes a first set of locking detents;

said male body of said male coupling half interengaging said sliding sleeve of said female coupling half during coupling moving said sliding sleeve from said first closed position to said second open position;

simultaneously with said interengagement of said body of said male coupling half and said sliding sleeve of said female coupling half, said flush faced end surface of said female valve of said female coupling half interengages said flush faced end surface of said cap of said male coupling half during coupling; and, said sliding sleeve and valve closing mechanism uniting said sliding sleeve of said female coupling half and said male body of said male coupling half insuring that said sliding sleeve is returned to said first position when said male and female coupling halves are uncoupled from each other.

29. A coupling, as claimed in claim 28 wherein said female body and said female body extension are substantially concentric and said sliding sleeve resides substantially radially intermediate said female body and said female body extension.

30. A coupling as claimed in claim 28 wherein said closing mechanism includes a second set of locking detents.

31. A coupling as claimed in claim 28 wherein said first set of locking detents is carried by said sliding sleeve.

32. A coupling as claimed in claim 30 wherein said second set of locking detents is carried by said female body extension.

33. A coupling as claimed in claim 28 wherein said closing mechanism of said female coupling half includes a spring operable between said female body and said sliding sleeve.

34. A coupling as claimed in claim 29 wherein said closing mechanism of said female coupling half includes a spring operable between said female body and said sliding sleeve.

35. A coupling as claimed in claim 30 wherein said closing mechanism of said female coupling half includes a spring operable between said female body and said sliding sleeve.

36. A coupling as claimed in claim 31 wherein said closing mechanism of said female coupling half includes a spring operable between said female body and said sliding sleeve.

37. A coupling as claimed in claim 32 wherein said closing mechanism of said female coupling half includes a spring operable between said female body and said sliding sleeve.

38. A coupling, comprising:

a female coupling half and a male coupling half, said female coupling half and said male coupling half being alternately coupled and uncoupled;

said male coupling half comprises: a male body; said male body of said male coupling half includes an exterior; said exterior of said male body of said male half includes a recess therein which extends circumferentially around said exterior; a male valve, said male valve includes a cap affixed to said male valve, said cap includes a flush faced end surface; a locking sleeve having an interior and an exterior, and said interior of said locking sleeve having threads thereon;

said female coupling half comprises: a female valve, said female valve includes a flush faced end surface; a female body; a female body extension affixed to said female body of said female coupling half, said female body extension includes an interior and an exterior, said exterior of said female body extension includes threads thereon; said female body extension includes a recess in said inner surface thereof a sliding sleeve movable with respect to said female body, said female body extension and said female valve; an outer sleeve having an inner surface and an outer surface, said inner surface having a shoulder thereon, said outer sleeve movable between an extended position and a retracted position; a generally cylindrically shaped cover, said generally cylindrically shaped cover includes a circumferential lip, said circumferential lip of said cover engages said female body, said cover engages said outer sleeve of said female body half; a locking ring, said locking ring having an inner surface and an outer surface, said locking ring residing radially intermediate said female body extension and said outer sleeve;

said sliding sleeve movable between: a first position abutting said female valve and closing said female valve, and, a second position not abutting said female valve thus opening said female valve;

said interior threads of said male locking sleeve interengage said exterior threads of said female body extension during coupling;

said male body of said male coupling half interengages said sliding sleeve of said female coupling half moving said sliding sleeve from said first closed position to said second open position during coupling;

simultaneously, during coupling, said interior threads of said male locking sleeve interengage said exterior threads of said female body extension, said body of said male coupling half interengages said sliding sleeve of said female coupling half, and, said flush faced end surface of said female valve of said female coupling half interengages said flush faced end surface of said cap of said male coupling half until coupling is completed;

said outer sleeve of said female member in said extended position interengages said locking sleeve of said male member preventing unwanted disconnection of said coupling through vibration of the coupling or unwanted rotation of the male locking sleeve;

said sliding sleeve of said female coupling half includes a first set of detents carried therewith; said first set of detents of said sliding sleeve of said female coupling half interengaging said circumferentially extending recess in said exterior of said male body during coupling of said coupling halves;

said female body extension of said female coupling half includes a second set of detents therein; said sliding sleeve of said female coupling half includes an exterior having a circumferentially extending recess therein; said second set of detents interengages said recess in said exterior of said sliding sleeve during coupling of said coupling halves;

said inner surface of said female body extension interengages and locks said first set of detents interengaging said recess in said male body of said male coupling half during coupling; said inner surface of said locking ring being in sliding engagement with said female body extension of said female coupling half during coupling locking and interengaging said second set of detents interengaging said recess in said exterior surface of said sliding sleeve valve of said female coupling half;

said outer sleeve of said female coupling half during uncoupling is moved longitudinally to said retracted position and said shoulder on said inner surface of said outer sleeve moves longitudinally away from said locking sleeve of said male coupling half enabling said male coupling half to move longitudinally away from said female coupling half as said threads on said interior of male locking sleeve are unthreaded from said threads on said exterior of said female body extension, said shoulder on said inner surface of said outer sleeve engaging said locking ring moving said locking ring releasing said second set of detents from said recess in said exterior surface of said sliding sleeve, and, said unthreading of said threads on said interior of said male locking sleeve from said exterior threads of said female body extension continues which in turn releases said sliding sleeve enabling movement of said sliding sleeve to said first closed position abutting said valve and releasing said first set of detents of said female coupling half into said interior recess of said female body extension permitting separation of said coupling halves.

39. A coupling as claimed in claim 38 wherein a first spring is operable between said female body and said sliding sleeve urging said sliding sleeve longitudinally outwardly; a second spring is operable between said female body and said locking ring urging said locking ring longitudinally outwardly locking said second set of detents in said exterior recess of said sliding sleeve; and, a third spring is operable between said circumferential lip of said cover and said outer sleeve urging said outer sleeve longitudinally outwardly.

40. A coupling as claimed in claim 39 wherein said third spring, during coupling, urges said outer sleeve into engagement with said male locking sleeve prohibiting rotation of said male locking sleeve and prohibiting disconnection of said locking sleeve.

41. A coupling, comprising:
a female coupling half and a male coupling half, said female coupling half and said male coupling half being alternately coupled and uncoupled;
said male coupling half comprises: a male body; a male valve, a locking sleeve having an interior and an exterior, said interior of said locking sleeve having threads thereon;
said female coupling half comprises: a female valve, a female body, a female body extension affixed to said female body of said female coupling half, said female body extension includes an interior and an exterior, said exterior of said female body extension includes threads thereon; a sliding sleeve movable with respect to said female body, said female body extension and said female valve; an outer sleeve having an inner surface and an outer surface, said inner surface having a shoulder thereon, and, said outer sleeve movable between an extended position and a retracted position; a locking ring, said locking ring having an inner surface and an outer surface, said locking ring residing radially intermediate said female body extension and said outer sleeve;
said sliding sleeve movable between: a first position abutting said female valve and closing said female valve, and, a second position not abutting said female valve thus opening said female valve; said outer sleeve of said female member in said extended position interengages said locking sleeve of said male member preventing unwanted disconnection of said coupling through vibration of the coupling or unwanted rotation of the male locking sleeve;

said interior threads of said male locking sleeve interengage said exterior threads of said female body extension during coupling;

said male body of said male coupling half interengages said sliding sleeve of said female coupling half moving said sliding sleeve from said first closed position to said second open position during coupling;

said outer sleeve of said female coupling half during uncoupling is moved longitudinally to said retracted position and said shoulder on said inner surface of said outer sleeve moves longitudinally away from said locking sleeve of said male coupling half enabling said male coupling half to move longitudinally away from said female coupling half as said threads on said interior of male locking sleeve are unthreaded from said threads on said exterior of said female body extension, said unthreading of said threads on said interior of said male locking sleeve from said exterior threads of said female body extension continues enabling movement of said sliding sleeve to said first closed position abutting said valve and releasing said first set of detents of said female coupling half into said interior recess of said female body extension.

42. A coupling as claimed in claim 41, comprising:
a generally cylindrically shaped cover, said generally cylindrically shaped cover includes a circumferential lip, said circumferential lip of said cover engages said female body, and said cover engages said outer sleeve of said female body half.

43. A coupling, comprising:
a female coupling half and a male coupling half, said female coupling half and said male coupling half being alternately coupled and uncoupled;
said male coupling half comprises: a locking sleeve having an interior and an exterior, said interior of said locking sleeve having threads thereon;
said female coupling half comprises: an outer sleeve having an inner surface and an outer surface, said inner surface having a shoulder thereon, and, said outer sleeve movable between an extended position and a retracted position;
said outer sleeve of said female member in said extended position interengages said locking sleeve of said male member preventing unwanted disconnection of said coupling through vibration of the coupling or unwanted rotation of the male locking sleeve;
and, said outer sleeve of said female coupling half during uncoupling is moved longitudinally to said retracted position and said shoulder on said inner surface of said outer sleeve moves longitudinally away from said locking sleeve of said male coupling half enabling said male coupling half to move longitudinally away from said female coupling half as said threads on said interior of male locking sleeve are unthreaded from said threads on said exterior of said female body extension, said unthreading of said threads on said interior of said male locking sleeve from said exterior threads of said female body extension continues enabling movement of said sliding sleeve to said first closed position abutting said valve and releasing said first set of detents of said female coupling half into said interior recess of said female body extension.

44. A coupling as claimed in claim 43 wherein a first spring is operable between said female body and said sliding sleeve urging said sliding sleeve longitudinally outwardly; a second spring is operable between said female body and said locking ring urging said locking ring longitudinally outwardly locking said second set of detents in said exterior recess of said sliding sleeve; and, a third spring is operable between said circumferential lip of said cover and said outer sleeve urging said outer sleeve longitudinally outwardly.

45. A coupling as claimed in claim 44 wherein said third spring, during coupling, urges said outer sleeve into engagement with said male locking sleeve prohibiting rotation of said male locking sleeve and prohibiting disconnection of said locking sleeve.

\* \* \* \* \*

UNITED STATES PATENT AND TRADEMARK OFFICE
CERTIFICATE OF CORRECTION

PATENT NO. : 7,575,024 B2  Page 1 of 1
APPLICATION NO. : 11/267482
DATED : August 18, 2009
INVENTOR(S) : Dennis Zeiber and Steve Wilkins It is certified that error appears in the above-identified patent and that said Letters Patent is hereby corrected as shown below:

Col. 12, Line 13; insert a --;-- after "thereof" and before "a sliding sleeve movable"

Signed and Sealed this

Third Day of November, 2009

David J. Kappos
*Director of the United States Patent and Trademark Office*